United States Patent
Wu

(10) Patent No.: US 10,892,803 B1
(45) Date of Patent: Jan. 12, 2021

(54) ANTENNA STRUCTURE AND OPERATION METHOD THEREOF

(71) Applicants: Inventec (Pudong) Technology Corporation, Shanghai (CN); INVENTEC CORPORATION, Taipei (TW)

(72) Inventor: Cheng-Yu Wu, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/698,982

(22) Filed: Nov. 28, 2019

(30) Foreign Application Priority Data

Sep. 11, 2019 (CN) ............................ 2019 1 0859966

(51) Int. Cl.
| | |
|---|---|
| *H04B 7/04* | (2017.01) |
| *H04B 7/0426* | (2017.01) |
| *H01Q 1/42* | (2006.01) |
| *H01Q 21/29* | (2006.01) |
| *H01Q 3/24* | (2006.01) |
| *H01Q 21/20* | (2006.01) |
| *H01Q 1/38* | (2006.01) |

(52) U.S. Cl.
CPC .............. *H04B 7/043* (2013.01); *H01Q 1/38* (2013.01); *H01Q 1/42* (2013.01); *H01Q 3/24* (2013.01); *H01Q 21/205* (2013.01); *H01Q 21/29* (2013.01)

(58) Field of Classification Search
CPC . H04B 7/043; H01Q 1/38; H01Q 1/42; H01Q 3/24; H01Q 21/205; H01Q 21/29
USPC .................. 375/267, 299, 347; 455/101, 132
See application file for complete search history.

(56) References Cited

U.S. PATENT DOCUMENTS

| | | | | |
|---|---|---|---|---|
| 4,929,956 A | * | 5/1990 | Lee ...................... | H01Q 3/2676 342/376 |
| 6,173,191 B1 | | 1/2001 | Jennings, III et al. | |
| 6,292,134 B1 | * | 9/2001 | Bondyopadhyay .... | H01Q 3/242 342/374 |
| 10,498,029 B1 | * | 12/2019 | Tran ...................... | H01Q 1/246 |
| 2019/0051969 A1 | * | 2/2019 | Song .................... | H01Q 1/3233 |
| 2019/0260136 A1 | * | 8/2019 | Lee .......................... | H01Q 3/36 |
| 2020/0021006 A1 | * | 1/2020 | Das ...................... | H01Q 13/206 |

FOREIGN PATENT DOCUMENTS

| | | |
|---|---|---|
| CN | 106329152 A | 1/2017 |
| CN | 107888241 A | 4/2018 |

* cited by examiner

*Primary Examiner* — Tesfaldet Bocure
(74) *Attorney, Agent, or Firm* — CKC & Partners Co., LLC

(57) ABSTRACT

An antenna structure includes a curved base and a plurality of multi-input multi-output (MIMO) antenna cell. The curved base has a convex curved surface. The MIMO antenna cells are uniformly and movably located on the convex curved surface. Each of the MIMO antenna cells has receiving units and transmission units.

9 Claims, 5 Drawing Sheets

ANTENNA STRUCTURE AND OPERATION METHOD THEREOF

RELATED APPLICATIONS

This application claims priority to China Application Serial Number 201910859966.3, filed Sep. 11, 2019, which are herein incorporated by reference.

BACKGROUND

Field of Disclosure

The present disclosure relates to an antenna structure and an operation method thereof. More particularly, the present disclosure is used for millimeter wave signal.

Description of Related Art

At present, the 5th generation mobile networks (5G) millimeter wave (mm Wave) antenna adopts multi-input multi-output (MIMO) transmission mode. The MIMO transmission mode mainly is realized by MIMO antenna module with multiple transmission channels.

In general, MIMO antennas are configured on a single plane of a printed circuit board. MIMO antennas are connected by circuits and forms antenna structure with multiple channels. However, a beam forming signal is with a specific directionality. That is, a beam forming signal has the best transmission rate in a specific direction, and the transmission rate of the beam forming signal in other direction is significantly decreased. When the antenna modules on the printed circuit board does not face to the specific direction and does not have the best transmission rate, the entire printed circuit board must be rotated. However, all of the antenna modules and channels are rotated at the same time. In this case, users can not adjust the directionality of the antenna modules independently.

SUMMARY

To achieve the above object, an aspect of the present disclosure is related to an antenna structure can receive beam forming signal in multiple directions.

According to some embodiments of the present disclosure, an antenna structure is used for receiving a millimeter wave signal. In some embodiments, an antenna structure includes a curved base and a plurality of multi-input multi-output (MIMO) antenna cells. The curved base has a convex curved surface. The MIMO antenna cells are uniformly and movably located on the convex curved surface on the convex curved surface. Each of the MIMO antenna cells has a plurality of receiving units and a plurality of transmission units to receive the millimeter wave signal independently.

In one or more embodiments of the present disclosure, the convex curved surface includes a spherical surface and a hemispherical surface.

In one or more embodiments of the present disclosure, the antenna structure further includes a plurality of connecting rods. Each of the MIMO antenna cells is connected to the convex curved surface of the curved base through a corresponding one of the connecting rods. Each of the connecting rods includes an extendable rod. An extendable rod of corresponding one of the connecting rods is connected to the convex curved surface to adjust length between the corresponding one of the MIMO antenna cells and the source of the millimeter wave signal. In some embodiment, each of the connecting rods further includes a joint. The joint of the corresponding one of the connecting rods connects the corresponding one of the MIMO antenna cells and the extendable rod to adjust an angle of the corresponding MIMO antenna cell and the source of the millimeter wave signal.

In one or more embodiments of the present disclosure, a shape of one of the MIMO antenna cells is honeycomb.

In one or more embodiments of the present disclosure, a plurality of receiving grooves is located on the convex curved surface of the curved base. Each of the receiving grooves is configured to receive a corresponding MIMO antenna cell of the MIMO antenna cells.

In one or more embodiments of the present disclosure, a shape of one of the receiving grooves is honeycomb.

In one or more embodiments of the present disclosure, the antenna structure further includes a processor. The processor is electrically connected to the MIMO antenna cell. The processor is configured to analyze position properties of the millimeter wave signal to select one of the MIMO antenna cells to transmit a feedback signal.

Another aspect of the present disclosure is related to an operation method used for an antenna structure.

According to one or more embodiments of the present disclosure, an operation method used for an antenna structure includes following operations. Provide an antenna structure. The antenna structure includes a curve base with a convex curved surface and a plurality of multi-input multi-output (MIMO) antenna cells movably located on the convex curved surface. Receive a signal transmission request by the antenna structure. Detect position properties of the signal transmission request. Select one of the MIMO antenna cells which has a better one of the positioning properties relative to a source of the signal transmission request. Transmit a feedback signal to the source of the signal transmission request through the selected one of the MIMO antenna cells. Recover the selected one of the MIMO antenna cells back to the original position. In one or more embodiments of the present disclosure, the operation method further includes adjusting a position of the selected MIMO antenna cell and transmission power according to the positioning properties of the signal transmission request.

In summary, according to one or more embodiments of the present disclosure, the antenna structure has a plurality of MIMO antenna cell configured on the convex curved surface. It enables that the antenna structure receives a lot of beam forming signal from different directions. The MIMO antenna cells on the antenna structure are independent of each other, and it is more conducive to analyzing the source of the signal and setting the optimal transmission conditions.

It is to be understood that both the foregoing general description and the following detailed description are by examples, and are intended to provide further explanation of the invention as claimed.

BRIEF DESCRIPTION OF THE DRAWINGS

The advantages of the present disclosure are to be understood by the following exemplary embodiments and with reference to the attached drawings. The illustrations of the drawings are merely exemplary embodiments and are not to be considered as limiting the scope of the present disclosure.

DETAILED DESCRIPTION

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations. Also, the same labels may be regarded as the corresponding components in the different drawings unless otherwise indicated. The drawings are drawn to clearly illustrate the connection between the various components in the embodiments, and are not intended to depict the actual sizes of the components.

In addition, terms used in the specification and the claims generally have the usual meaning as each terms are used in the field, in the context of the disclosure and in the context of the particular content unless particularly specified. Some terms used to describe the disclosure are to be discussed below or elsewhere in the specification to provide additional guidance related to the description of the disclosure to specialists in the art.

With the advent of the 5th generation mobile networks (5G), the frequency band used by the 5G is, for example, 28 GHz, which corresponds to millimeter wave signals. The transmission of millimeter wave signals is realized by a multi-input multi-output (MIMO) transmission mode. However, each of the millimeter wave beam forming signals is with a specific directionality and has the best transmission rate in a specific direction. If a millimeter wave beam forming signal is not received in the specific direction, the transmission power of the millimeter wave beam forming signal is significantly affected.

Figure 1A:
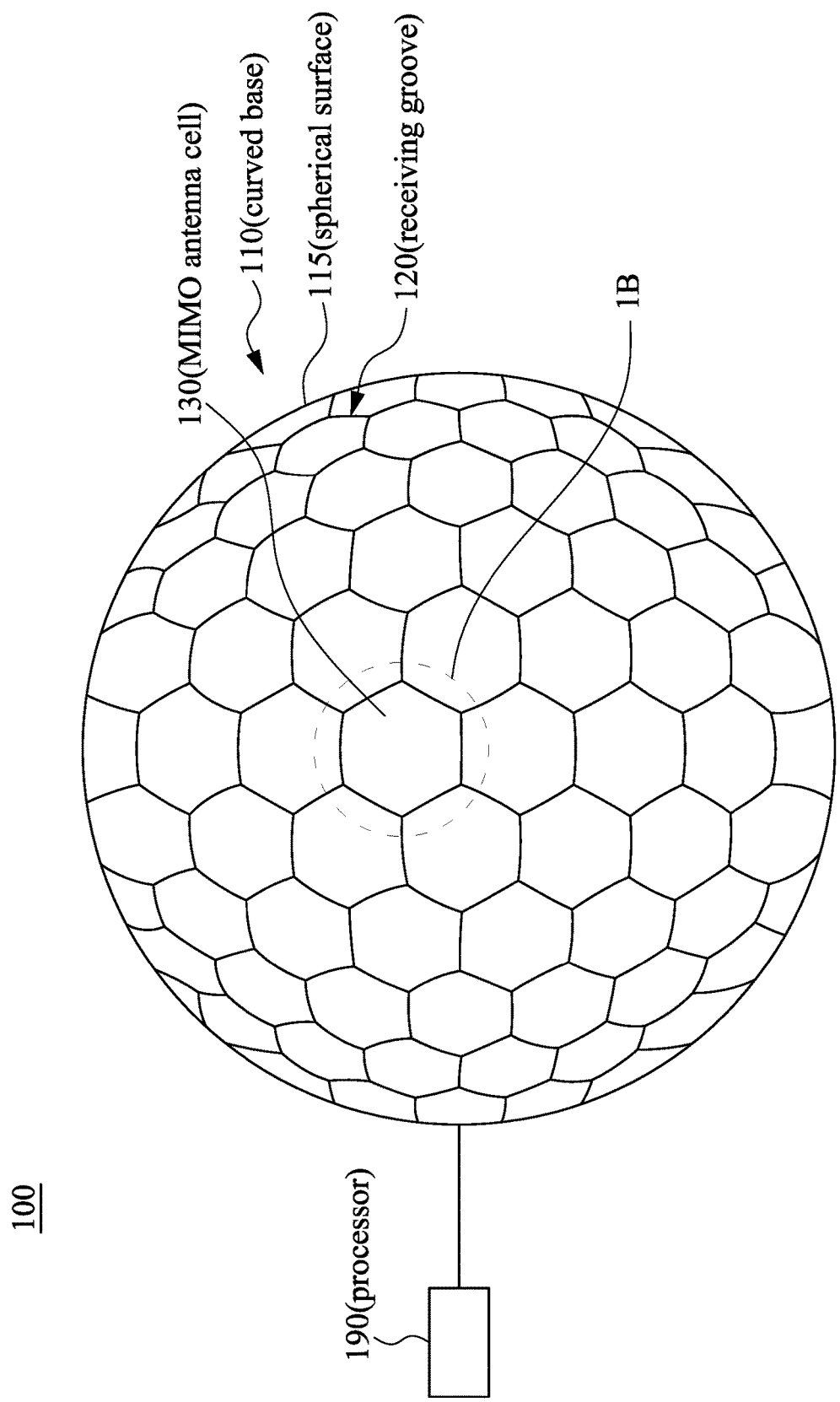
FIG. 1A illustrates a schematic view of an antenna structure according to one embodiment of the present disclosure.

Please refer to FIG. 1A. FIG. 1A illustrates a schematic view of an antenna structure 100 according to one embodiment of the present disclosure. As shown in FIG. 1A, the antenna structure includes a curved base 110 and MIMO antenna cells 130 located on the curved base 110.

The curved base 110 has a convex curved surface. As shown in FIG. 1A, the convex curved surface of the curved base 110 is a spherical surface 115. A plurality of receiving grooves 120 is configured on the spherical surface 115. The receiving groove 120 is used to receive the MIMO antenna cells 130. Each of the MIMO antenna cells 130 can receive and transmit signals independently. The MIMO antenna cells 130 are respectively located on the different position of the spherical surface to receive signals in different angles. Therefore, even if a millimeter wave beam signal has specific directionality, since there are many MIMO antenna cells 130 uniformly located on the spherical surface 115, a suitable MIMO antenna cell of the MIMO antenna cells 130 can be selected to receive the millimeter wave beam forming signal with better transmission power.

In FIG. 1A, some of the receiving grooves 120 are with honeycomb shapes. The receiving grooves 120 with honeycomb shapes are used to maximize the density of the MIMO antenna cells 130 on the spherical surface 115. As shown in FIG. 1A, the receiving grooves 120 with honeycomb shapes can forms a dense arrangement on a part of the spherical surface 115. It should be understood that FIG. 1A only illustrates a part of the spherical surface 115. At other positions of the spherical surface 115, other receiving grooves 120 with shapes differing from honeycomb-like shapes can be used, and the combination of the receiving grooves 120 with different shapes maximizes the density of the MIMO antenna cells 130 on the spherical surface 115.

The antenna structure 100 further includes other operation circuits and power supplies used to operate the MIMO antenna cells 130. As shown in FIG. 1A, in some embodiments, the antenna structure 100 further includes a processor 190. The processor 190 is electrical connected to the MIMO antenna cells 130 by the external circuits in the antenna structure 100. Functions of the processor 190 are discussed in following paragraphs.

In this embodiment, many of the MIMO antenna cells 130 are designed to have honeycomb shapes. The MIMO antenna cells 130 with honeycomb shapes can be configured in the receiving grooves 120. In some embodiments of the present disclosure, the curved base of the antenna structure can have no receiving groove, and honeycomb-like curved base can directly located on the convex curved surface (e.g. spherical surface) of the curved base. In that case, a great density of the MIMO antenna cells on the spherical surface can also be realized by the honeycomb-like MIMO antenna cells.

Figure 1B:
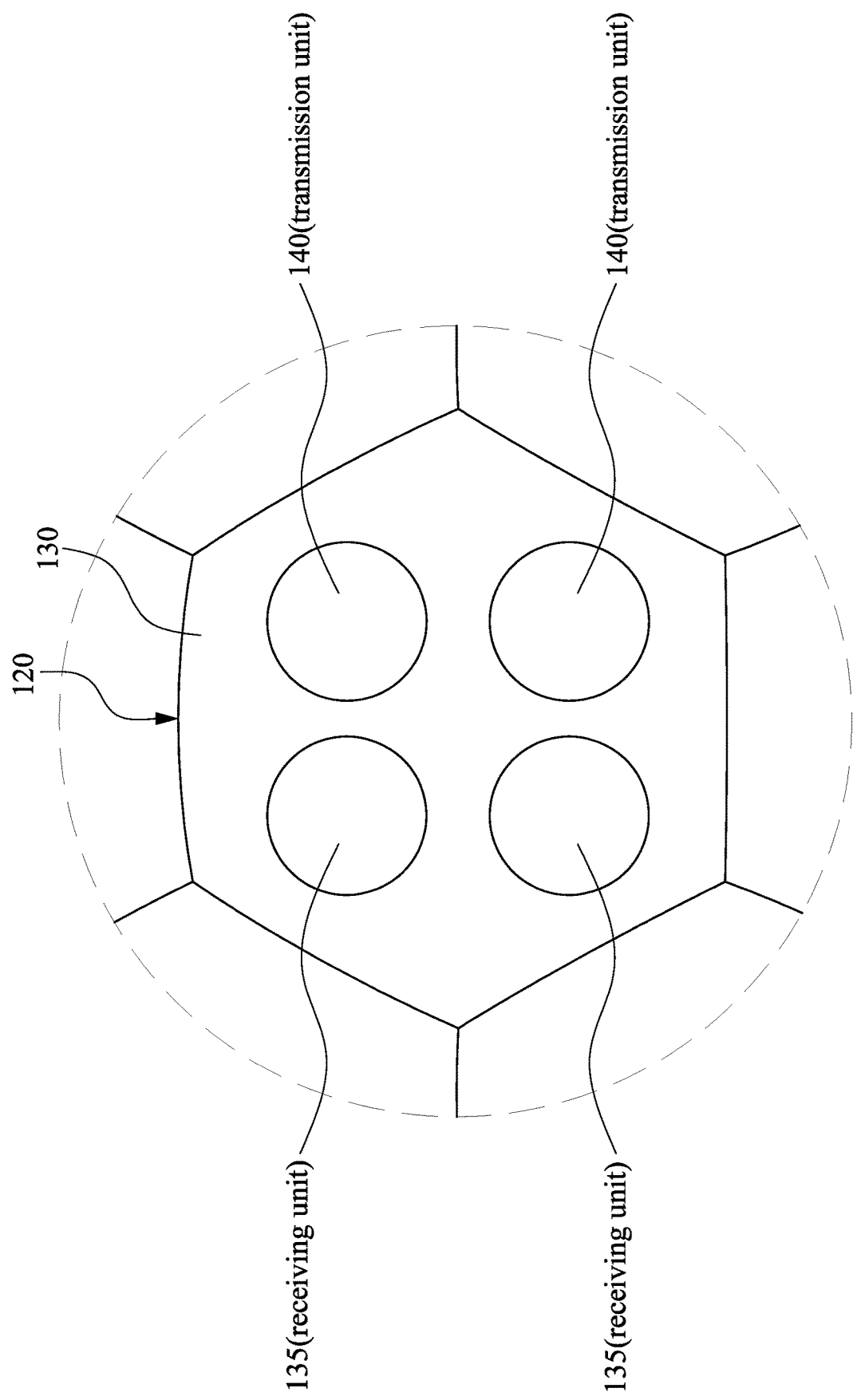
FIG. 1B illustrates a schematic view of an antenna cell on the antenna structure of FIG. 1A.

Please refer to FIG. 1B. FIG. 1B illustrates a schematic view of a MIMO antenna cell 130 on the antenna structure 100 of FIG. 1A. As described above, each of the MIMO antenna cells 130 can have functions of receiving and transmitting beam forming signals. As shown in FIG. 1B, the MIMO antenna cell 130 in the receiving groove 120 has 2*2 channels. That is, the MIMO antenna cell 130 has four channels, and the four channels include two receiving units 135 and two transmission units 140. The IC used for the MIMO antenna cells 130 determines the number of the channels in the MIMO antenna cells 130. The IC used for the MIMO antenna cell 130 can be configured in the operation circuits described above and not shown in FIGS. for the purpose of the simple explanations. In some embodiments, the MIMO antenna cell 130 can have different numbers of channels (e.g., 4*4 channels, 8*8 channels).

Figure 2:
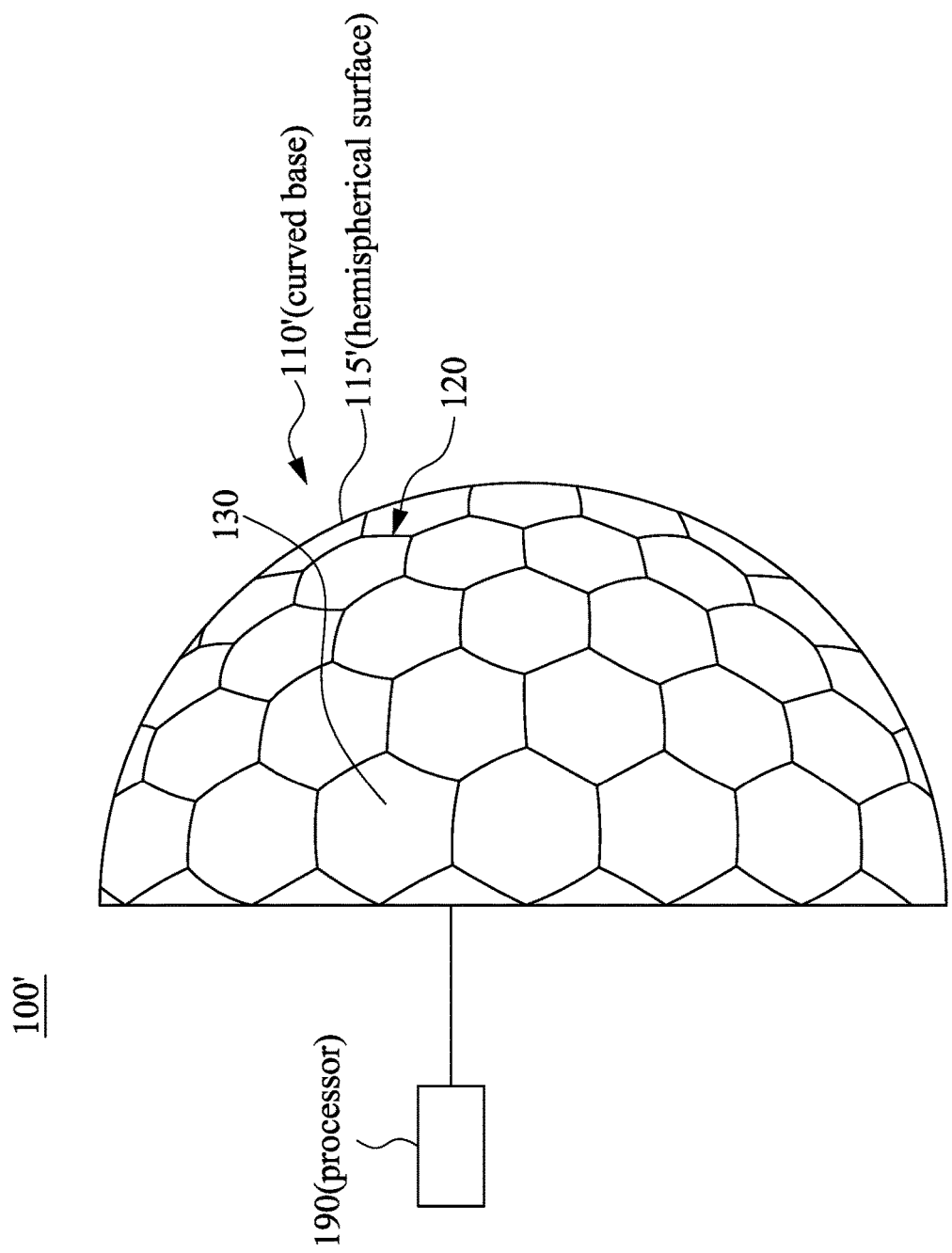
FIG. 2 illustrates a schematic view of an antenna structure according to another embodiment of the present disclosure.

Please refer to FIG. 2. FIG. 2 illustrates a schematic view of an antenna structure 100' according to another embodiment of the present disclosure. As shown in FIG. 2, the curved base 110' of the antenna structure 100' has a hemispherical surface 115'. Similarly, the MIMO antenna cells 130 are respectively configured in the receiving grooves 120. Compared with the antenna structure 100 in FIG. 1A, the antenna structure 100' can receive signals from different direction in a smaller scope. In some embodiments of the present disclosure, the curved base can have a convex curved surface with different shape from the spherical surface 115 or hemispherical surface 115'. The functions of receiving a beam forming signal with a specific directionality can also be realized by a convex curved surface with different shape.

Figure 3:
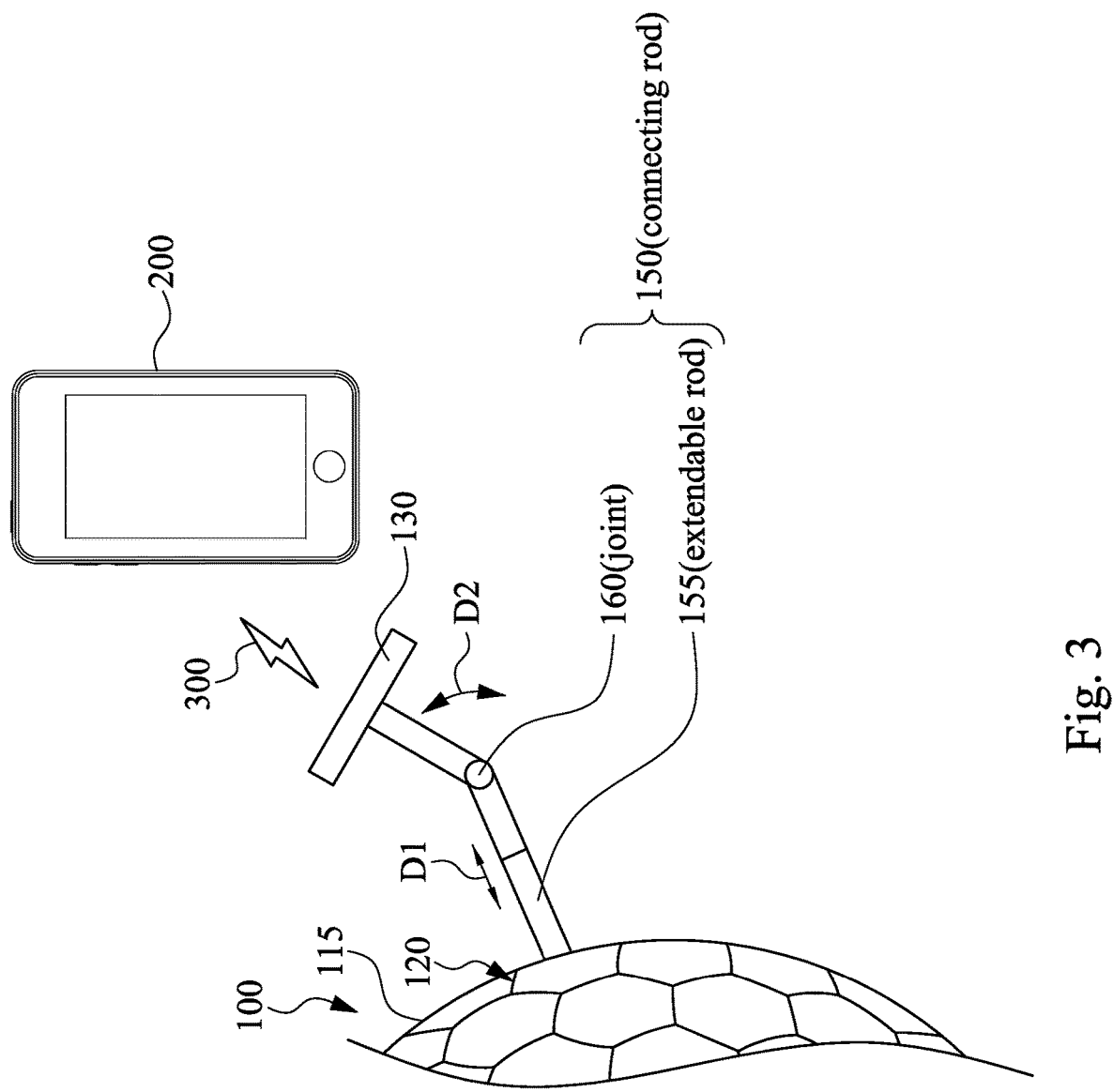
FIG. 3 schematically illustrates an adjustment of a distance and an angle of a MIMO antenna cell of an antenna structure according one embodiment of the present disclosure.

Please refer to FIG. 3. FIG. 3 schematically illustrates an adjustment of a distance and an angle of a MIMO antenna cell 130 of an antenna structure 100 according one embodiment of the present disclosure. As shown in FIG. 3, in some embodiments, the antenna structure 100 further has a plurality of connecting rods 150. One of the MIMO antenna cells 130 is movably connected to the spherical surface 115 through a corresponding connecting rod 150. When the antenna structure 100 receives beam forming signals and wants to transmit feedback signals, the connecting rods 150 are used to increase the transmission rate.

For example, an event of receiving beam forming signals is that a phone 200 transmitting signal 300 (e.g., a request for transmitting feedback signals) to antenna structure 100 in 5G. More specifically, the antenna structure 100 can be a part of a network base station, and the phone 200 requests the network base station to transmit feedback signals.

In some embodiments, the connecting rod 150 has an extendable rod 155. The extendable rod 155 is used to adjust the distance between a MIMO antenna cell 130 and the source of the signal 300. As shown in FIG. 3, the MIMO antenna cell 130 can move out from the receiving groove 120, the MIMO antenna cell 130 can move along a direction D1, and the distance between the MIMO antenna cell 130 and the source of the signal 300 can be adjusted a little.

In some embodiments, the connecting rod 150 further includes a joint 160. The MIMO antenna cell 130 is connected to the extendable rod 155 through the joint 160. As shown in FIG. 3, for example, the joint 160 is a pivot, and the MIMO antenna cell 130 can rotate 180 degrees in a direction D2.

In this embodiment, the antenna structure 100 further includes a processor 190 (please refer to FIG. 1A). As described above, the processor 190 is electrically connected to multiple MIMO antenna cells 130. After each of the MIMO antenna cells 130 of the antenna structure 100 receives the signal 300 independently, the processor 190 can analyze the positioning properties of the signal 300. The positioning properties of the signal 300 include the position of the source of the signal 300 and the directionality of the signal 300. Therefore, the processor 190 can select one of the MIMO antenna cells 130 to transmit feedback signal to the source of the signal 300. The selected one of the MIMO antenna cells 130 can have a better transmission power than others.

Further, in some embodiments, the processor 150 can be electrically connected to the connecting rod 150 to control the angle and distance between the MIMO antenna module 130 and the source of the signal (e.g., phone 200). The connecting rod 150 can further include a mechanical structure. The mechanical structure can be a movable mechanism (e.g., a motor) controlled by the processor 190.

Figure 4:
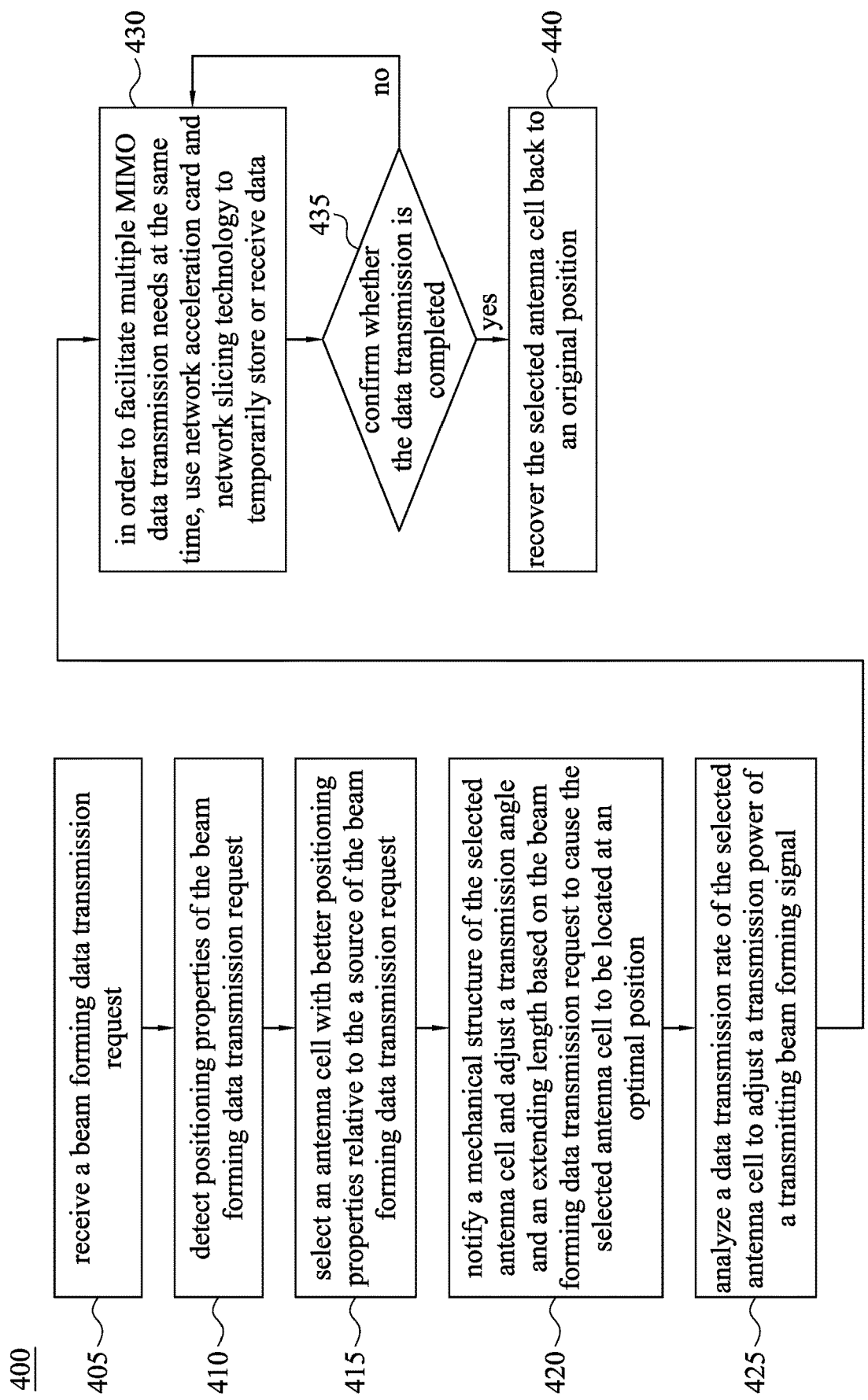
FIG. 4 illustrates a flow chart of an operation method according to one embodiment of the present disclosure.

In order to describe how to receive and feedback a beam forming signal specifically, FIG. 4 illustrates a flow chart of an operation method 400 for an antenna structure 100 according to one embodiment of the present disclosure. Please refer to FIG. 3 and FIG. 4 to understand the operation of the antenna structure 100 in one embodiment of this present disclosure.

Please refer to FIG. 4. In operation 405, the antenna structure 100 receives a beam forming data transmission request. For example, as shown in FIG. 3, a phone transmits a signal 300 to the antenna structure 100 and requests the antenna structure 100 to transmit the beam forming data. In 5G, it should be understood that the signal 300 transmitted by users is a millimeter wave beam forming signal when users use 5G communication device. Therefore, the signal 300 is with a specific directionality. Since there are many MIMO antenna cells 130 uniformly located on the spherical surface 115 of the antenna structure 100, a suitable one of the MIMO antenna cells 130 can be found to receive the millimeter wave beam forming signal with better transmission power than others without moving the antenna structure 100 even if the signal 300 is with a specific directionality. For example, the signal 300 is a beam forming data transmission request. It facilitates the position properties analysis of the beam forming data transmission request.

After operation 405, in operation 410, the antenna structure 410 detects positioning properties (e.g., directionality of the request for the data transmission) of the beam forming data transmission request. In some embodiments, the antenna structure 410 can further detect other positioning properties. The MIMO antenna cells 130 of the antenna structure 100 can receive the signal 300. However, since the signal 300 is with the specific direction, one of the MIMO antenna cells 130 is located at a position on the spherical surface 115 receives the signal 300 with first intensity, another one of the MIMO antenna cells 130 is located at another position on the spherical surface 115 receive the signal 300 with second intensity, and the first intensity is different from the second intensity. Therefore, the processor 190 can analyze the intensity received by different MIMO antenna cells 130 at different position to have the positioning properties of the signal 300. After operation 410, in operation 415, the processor 190 of the antenna structure 100 can select one of the MIMO antenna cells 130 which has a better positioning properties relative to the a source of the beam forming data transmission request than others. The selected one of the MIMO antenna cells can transmit signals or data to the source of the beam forming data transmission request based on the analysis of the positioning properties of the beam forming data transmission request (e.g., signal 300).

In some embodiments, for example, the position of the source of the signal 300 (e.g., phone 200) can be found by the analysis of the positioning properties of the signal 300.

After operation 415, in operation 420, the antenna structure 100 notifies a mechanical structure of the selected one of the MIMO antenna cells 130 and adjusts a transmission angle and an extending length based on the beam forming data transmission request to cause the selected one of the MIMO antenna cells 130 to be located at an optimal position. Specifically, based on the analysis of the positioning properties of the beam forming data transmission request from the processor 190, the transmission angle and the extending length related to the selected MIMO antenna cell 130 and the spherical surface 115 can be adjusted by using a connecting rod 150 of the antenna structure 100. Therefore, as shown in FIG. 3, a distance between the selected MIMO antenna cell 130 and the source of the signal 300 is adjusted by using a extendable rod 155 of the connecting rod 150, and the transmission angle, which determines that where the selected MIMO antenna cell 130 face to, is adjusted by using a joint 160 of the connecting rod 150.

After operation 420, in operation 425, the antenna structure 100 analyzes a beam forming data transmission rate of the selected one of the MIMO antenna cells 130 to adjust the transmission power of the transmitting beam forming signal. Specifically, as shown in FIG. 3, the processor 190 adjusts the selected MIMO antenna cell 130 to have the optimal transmission power when the adjustment of the transmission angle and the extending length of the selected MIMO antenna cell 130 are finished. Then, the selected MIMO antenna cell 130 transmits a feedback signal to the phone 200. In some embodiments, the antenna structure 100 with multiple MIMO antenna cells 130 can dynamically adjust the transmission rate.

In operation 430, in order to facilitate multiple MIMO data transmission needs at the same time, the antenna structure 100 can use network acceleration card and network slicing technology to temporarily store or receive data.

Therefore, it can facilitate the temporary data storage of multiple millimeter wave MIMO data transmission at the same time and accelerate the signal transmission.

In operation 435, the antenna structure 100 confirms whether the data transmission is completed. If the data transmission is not completed, the antenna structure 100 returns to the previous operation 430 to continue the data transmission. If the transmission is completed, the antenna structure 100 continues to operation 440. In operation 440, the antenna structure 100 recovers the selected MIMO antenna cell 130 back to an original position.

In summary, an antenna structure of the present disclosure has a convex curved surface. For example, the convex curved surface is a spherical surface. By arranging multiple independent MIMO antenna cells on the convex curved surface, the antenna structure can receive millimeter wave beam forming signals with different directionalities. As the received signal is a request of a data transmission, the antenna structure can analyze results of receiving signals from different antenna cells to select a suitable MIMO antenna cell. The selected MIMO antenna cell can transmit feedback signal with suitable transmission condition based on the analysis, suitable transmission rate) to the source of the request of the data transmission. Therefore, the antenna structure of the present disclosure causes the transmission to be optimized. By using the antenna structure, users reduce total transmission time, optimize the overall transmission efficiency, and improve the problem of the data transmission rate of a signal with a specific directionality.

Although the present disclosure has been described in considerable detail with reference to certain embodiments thereof, other embodiments are possible. Therefore, the spirit and scope of the appended claims should not be limited to the description of the embodiments contained herein. In view of the foregoing, it is intended that the present disclosure cover modifications and variations of this invention provided they fall within the scope of the following claims.

What is claimed is:

1. An antenna structure used for receiving a millimeter wave signal, comprising:
   a curved base having a convex curved surface;
   a plurality of multi-input multi-output (MIMO) antenna cells, uniformly and movably disposed on the convex curved surface, wherein each of the MIMO antenna cells has a plurality of receiving units and a plurality of transmission units to receive the millimeter wave signal independently; and
   a plurality of connecting rods, wherein each of the MIMO antenna cells is connected to the convex curved surface of the curved base through a corresponding one of the connecting rods, and each of the connecting rods comprises:
   an extendable rod, connected to the convex curved surface to adjust length between the corresponding one of the MIMO antenna cells and a source of the millimeter wave signal.

2. The antenna structure of claim 1, wherein the convex curved surface comprises a spherical surface or a hemispherical surface.

3. The antenna structure of claim 1, wherein each of the connecting rods further comprises:
   a joint connecting the corresponding one of the MIMO antenna cells and the extendable rod to adjust an angle of the corresponding one of the MIMO antenna cells and the source of the millimeter wave signal.

4. The antenna structure of claim 1, wherein a shape of one of the MIMO antenna cells is honeycomb.

5. The antenna structure of claim 1, further comprising a plurality of receiving grooves, wherein the receiving grooves are disposed on the convex curved surface of the curved base and each of the receiving grooves is configured to receive a corresponding one of the MIMO antenna cells.

6. The antenna structure of claim 5, wherein a shape of one of the receiving grooves is honeycomb.

7. The antenna structure of claim 1, further comprising a processor electrically connected to the MIMO antenna cells, wherein the processor is configured to analyze position properties of the millimeter wave signal to select one of the MIMO antenna cells to transmit a feedback signal.

8. An operation method used for an antenna structure, comprising:
   providing an antenna structure, wherein the antenna structure comprises a curve base with a convex curved surface and a plurality of multi-input multi-output (MIMO) antenna cells movably disposed on the convex curved surface;
   receiving a signal transmission request by the antenna structure;
   detecting positioning properties of the signal transmission request;
   selecting one of the MIMO antenna cells which has a better one of the positioning properties relative to a source of the signal transmission request;
   transmitting a feedback signal to the source of the signal transmission request through the selected one of the MIMO antenna cells; and
   recovering the selected one of the MIMO antenna cells back to an original position.

9. The operation method of claim 8, further comprising:
   adjusting a position and a transmission power of the selected one of the MIMO antenna cells according to the positioning properties of the signal transmission request.

* * * * *